(12) United States Patent
Aguilar (10) Patent No.: US 8,418,824 B2
(45) Date of Patent: Apr. 16, 2013

(54) ELECTRIC VEHICLE AND ROADWAY POWER SYSTEM THEREFORE

(76) Inventor: Jorge Aguilar, Orinda, CA (US)

( * ) Notice: Subject to any disclaimer, the term of this patent is extended or adjusted under 35 U.S.C. 154(b) by 0 days.

(21) Appl. No.: 13/317,682

(22) Filed: Oct. 24, 2011

(65) Prior Publication Data

US 2013/0037367 A1 Feb. 14, 2013

(51) Int. Cl.
*B60M 1/00* (2006.01)
(52) U.S. Cl.
USPC .................. 191/22 C; 191/47; 191/49; 191/6
(58) Field of Classification Search .................. 191/49, 191/22 C, 29 R, 6, 22 R, 45 R, 47, 10
See application file for complete search history.

(56) References Cited

U.S. PATENT DOCUMENTS

| | | | | |
|---|---|---|---|---|
| 4,476,947 A | * | 10/1984 | Rynbrandt | 180/2.1 |
| 5,464,082 A | * | 11/1995 | Young | 191/2 |
| 6,230,861 B1 | * | 5/2001 | Cornic | 191/45 R |

* cited by examiner

*Primary Examiner* — Mark Le
(74) *Attorney, Agent, or Firm* — Francis Law Group (57) ABSTRACT

An electrical vehicle transportation system that includes a powered roadway system having electrically conductive roadway segments that are engageable to a roadway surface, and an electrical vehicle having a control system and an energy harvesting system, the vehicle control system being programmed to energize roadway segments disposed within a defined vehicle envelope and de-energize the roadway segments prior to transitioning outside of the vehicle envelope when the vehicle is traversing the roadway.

5 Claims, 9 Drawing Sheets

ELECTRIC VEHICLE AND ROADWAY POWER SYSTEM THEREFORE

CROSS-REFERENCE TO RELATED APPLICATIONS

This application claims the benefit of U.S. Provisional Application No. 61/574,986, filed Aug. 12, 2011.

FIELD OF THE INVENTION

The present invention relates to electrically operated transportation vehicle systems. More particularly, the present invention relates to an improved electrically operated transportation vehicle and roadway power system for supplying power to the electric vehicle.

BACKGROUND OF THE INVENTION

As is well known in the art, there are several types of electrically operated vehicles. The first type is heavily dependent on an outside power source for functional operation. One well-known example comprises electrically powered public transportation vehicles, such as a trolley or bus, which receive electrical power through overhead electrical cables. The noted vehicles typically have a very limited battery pack and, hence, are generally confined to region(s) proximate power cables.

The second type of electric vehicle employs a battery pack for its power supply. Due to the limitations of battery capacity, a pure battery-operated vehicle typically has to reserve a significant portion of its weight for the battery pack. A pure battery-operated vehicle also has a significant limitation in the distance it can travel between battery charges.

Current research and development is centered on the third type of electric vehicles, i.e. "hybrid" vehicles. Hybrid vehicles use both electric power and a self-contained power source, such as an internal combustion engine, which drives a generator for re-charging the batteries and/or providing electrical energy to the drive motors when not operating on the batteries.

There are several well known drawbacks and disadvantages associated with hybrid vehicles. Among the drawbacks is the use of a combustion engine and the weight and emissions associated therewith. Hybrid vehicles are also typically quite expensive. Recent research and development activities have thus shifted toward a fourth type of electric vehicle—vehicles that have their own battery packs and are also able to receive electrical power through electrical conductors associated with (i.e. on or above) the roadway. Illustrative are the electric vehicles and associated roadway power systems disclosed in U.S. Pat. Nos. 6,471,020, 5,134,254 and 5,810,136.

In U.S. Pat. No. 6,471,020 an electric vehicle and an associated roadway power system is disclosed, wherein the power from the roadway is transferred to the vehicle via electrically conductive tires. The roadway includes two parallel strips, which are embedded in the roadway, for power distribution; one connected strip to a negative potential and the other strip to a positive potential. An external rectifier is also recessed in the roadway surface to convert AC voltage to DC voltage.

There are several significant drawbacks and disadvantages associated with the noted electric vehicle and roadway system. A major drawback is that recessed strips are susceptible to short circuits due to water, ice and any conducting foreign objects on the road.

Further, since the strips are continuously energized, the roadway power system poses a serious risk to foot traffic.

In U.S. Pat. No. 5,134,254 an electric vehicle and associated roadway power system is disclosed, wherein the power from the roadway is transferred to the vehicle via electrically conductive plates. The plates, which are embedded in the roadway, are installed in line with a grounded plate followed by a power plate and are energized by trolleys in front and back of the vehicle. This requires the plates to be accessible outside of the vehicle, which similarly poses a serious risk to foot traffic.

In U.S. Pat. No. 5,810,136 another electric vehicle and associated roadway power system is disclosed, wherein the power from the roadway is transferred to the vehicle via electrically conductive plates. The plates are isolated from each other with the negative plates being continuously energized by one side of a conducting ribbon and the positive plates being energized, as needed, under the electric vehicle by the opposite side of the conducting ribbon. There are several significant drawbacks and disadvantages associated with the noted electric vehicle and roadway system. A major drawback is that the vehicle employs a very complicated electromagnetic system to obtain power from the roadway system. According to the invention, electromagnets in the car attract a conducting ribbon in the roadway which contacts a positive vehicle plate. The positive vehicle plate then connects to an external plate.

When the ribbon is in communication with the vehicle the lower portion of the ribbon is in contact with the external plates, whereby all the external plates are energized with negative polarity.

A further drawback of noted electric vehicle and roadway system is that the energy that can be transferred to the vehicle is significantly limited. Indeed, in some instances, such as a steep terrain, the magnitude of the power that is required to power the vehicle may be insufficient.

It would thus be desirable to provide an electric vehicle and associated roadway power system that overcomes that drawbacks and disadvantages associated with prior art electric vehicles and roadway power systems.

It is therefore an object of the present invention to provide an electric vehicle and associated roadway power system (hereinafter "electric vehicle transportation system") that can be readily employed on and/or in virtually all roadways.

It is another object of the present invention to provide an electric vehicle transportation system that provides adequate power to operate the electric vehicle over various roadway terrains and surfaces.

It is another object of the present invention to provide an electric vehicle transportation system having an improved roadway power system that is safe for foot traffic that may come in contact with the powered roadway.

It is another object of the present invention to provide an electric vehicle transportation system having an electric vehicle and associated roadway power system, wherein the electric vehicle includes a battery power pack to enable operation of the vehicle on conventional road surfaces and an energy harvesting system for enabling the vehicle to receive power from the roadway power system.

It is another object of the present invention to provide an electric vehicle transportation system having an improved roadway power system over which conventional motor vehicles safely operate.

It is another object of the present invention to provide an improved roadway power system for an electric vehicle having segmented, parallel electrically-conducting surfaces that are energized only upon engagement with an electric vehicle operating on the roadway and demanding power.

SUMMARY OF THE INVENTION

The present invention is directed to an improved electric vehicle transportation system that can be readily employed on and/or in virtually all roadways.

In one embodiment of the invention, the electric vehicle transportation system includes an electric vehicle having a unique energy harvesting system and a powered roadway system.

In one embodiment of the invention, the powered roadway system includes at least one pair of surface mounted conductors that are separated into segments parallel to the direction of travel of the vehicle on the roadway. Each of the segments is separately energized from a roadway power source.

In some embodiments, each roadway segment is energized when a vehicle having an energy harvesting system is turned on and the system is in contact with the segment. This feature provides for safety to foot traffic across the roadway in that the segments are only energized when a vehicle is in communication therewith.

In a preferred embodiment, the length of the segments is also such that the segments are de-energized before any part of a segment is exposed outside of an electric vehicle envelope while the vehicle is moving thereon.

In some embodiments of the invention, the electric vehicle energy harvesting system includes a set of rolling or sliding contacts that are adapted to contact the powered roadway segments. In some embodiments, the rolling or sliding contacts are movable transversely with respect to the vehicle so that the vehicle can maneuver crosswise of the roadway while maintaining contact with the energized roadway segments.

In a preferred embodiment of the present invention, the electric vehicle also includes battery-energized electrical driving motors that can also be energized by the roadway segments.

A key advantage of the invention is thus the provision of an improved roadway power system for an electric vehicle having segmented, parallel electrically-conducting surfaces that are energized only upon engagement with an electric vehicle operating on the roadway and within a defined and controlled vehicle envelope.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

Before describing the present invention in detail, it is to be understood that this invention is not limited to particularly exemplified apparatus, systems, structures or methods as such may, of course, vary. Thus, although a number of apparatus, systems and methods similar or equivalent to those described herein can be used in the practice of the present invention, the preferred apparatus, systems, structures and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise. Thus, for example, reference to "a roadway segment" includes two or more such segments and the like.

The following disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

As will readily be appreciated by one having ordinary skill in the art, the present invention substantially reduces or eliminates the disadvantages and drawbacks associated with prior art electric vehicles and roadway power systems.

As stated above and discussed in detail herein, the present disclosure is directed to an improved electric vehicle transportation system comprising an electric vehicle having a unique energy harvesting system and a powered roadway system. In one embodiment of the invention, the powered roadway system includes at least one pair of surface mounted conductors that are separated into segments parallel to the direction of travel of the vehicle on the roadway. Each of the segments is separately energized from a roadway power source.

Each segment is also only energized when a vehicle having the necessary energy harvesting system is turned on, the system is in contact with the segment and the vehicle is demanding power from the segment. This feature provides for safety to foot traffic across the roadway in that the segments are only energized when a vehicle is in communication therewith.

The length of the segments is also such that the segments are de-energized before any part of a segment is exposed outside of an electric vehicle envelope while the vehicle is moving thereon. As a result, pedestrians will not be exposed to an energized portion of the roadway surface at the same time a vehicle is engaged therewith.

As an additional safety feature, the electric vehicle also incorporates means which de-energize the roadway segments upon a direction change that would indicate an abnormal activity in a moving vehicle.

The electric vehicle energy harvesting system further includes a set of rolling or sliding contacts (or e-bars), which contact the powered roadway segments. In some embodiments, the rolling or sliding contacts are movable transversely with respect to the vehicle so that the vehicle can maneuver crosswise of the roadway while maintaining contact with the energized roadway segments.

In a preferred embodiment of the present invention, the electric vehicle also includes battery-energized electrical driving motors that can also be energized by the roadway segments.

Figure 1:
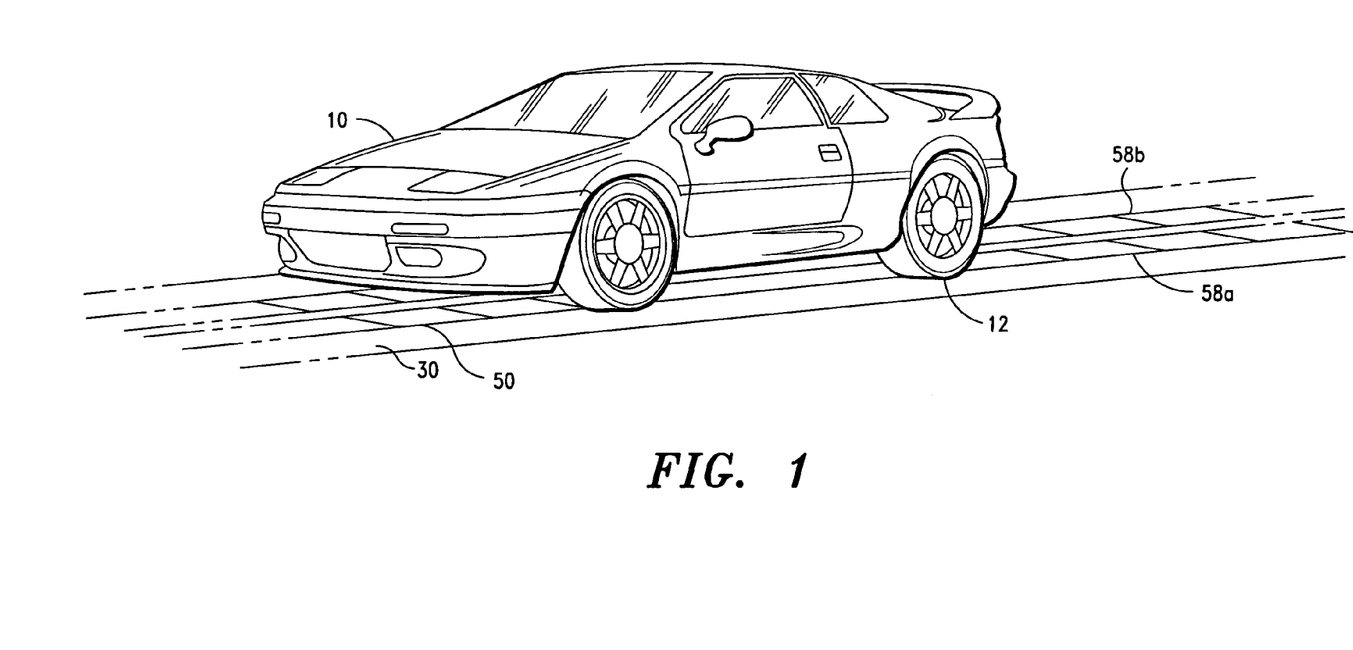
FIG. 1 is a perspective view of a vehicle traversing a powered roadway of the invention, in accordance with one embodiment of the invention.

Referring now to FIG. 1, there is shown one embodiment of an electric vehicle 10 traversing a powered roadway system 50 of the invention. As illustrated in FIG. 1, the electric vehicle 10 is of a conventional form having a conventional wheel system 12 for support of the vehicle 10 above the road surface 30.

Figure 2:
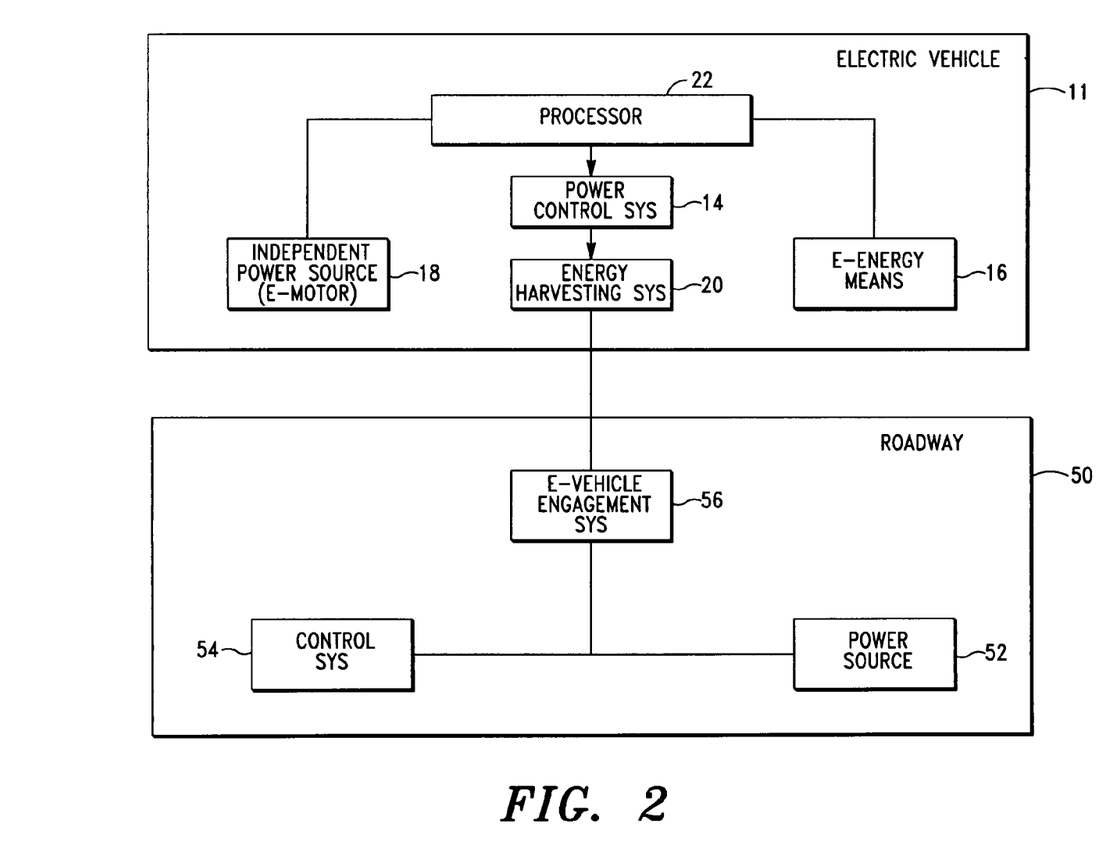
FIG. 2 is a schematic illustration of the electric vehicle and powered roadway systems, in accordance with one embodiment of the invention.

Referring now to FIG. 2, in some embodiments, the electric vehicle 10 further includes an e-vehicle power system 11 having a power control system 14, electrical energy means 16, such as battery pack, a self-contained or independent power source 18, such as electrical driving motors, an energy harvesting system 20, and a processor 22. As discussed in detail herein, in some embodiments, the processor 22 comprises a variable frequency drive controller.

As illustrated in FIG. 2, the powered roadway system 50 includes a power source 52, such as alternating current ("ac") power from a utility, a control system 54, and an e-vehicle engagement system 56.

Referring now to FIGS. 3-6, in one embodiment of the invention, the electric vehicle engagement system 56 includes a pair of surface mounted conductors 58a, 58b that are separated into segments 60 that are preferably disposed parallel to the direction of travel of a vehicle, such as vehicle 10, on the powered roadway system 50. In a preferred embodiment, each of the segments 60 is separately energized by the power source 52.

Figure 3:
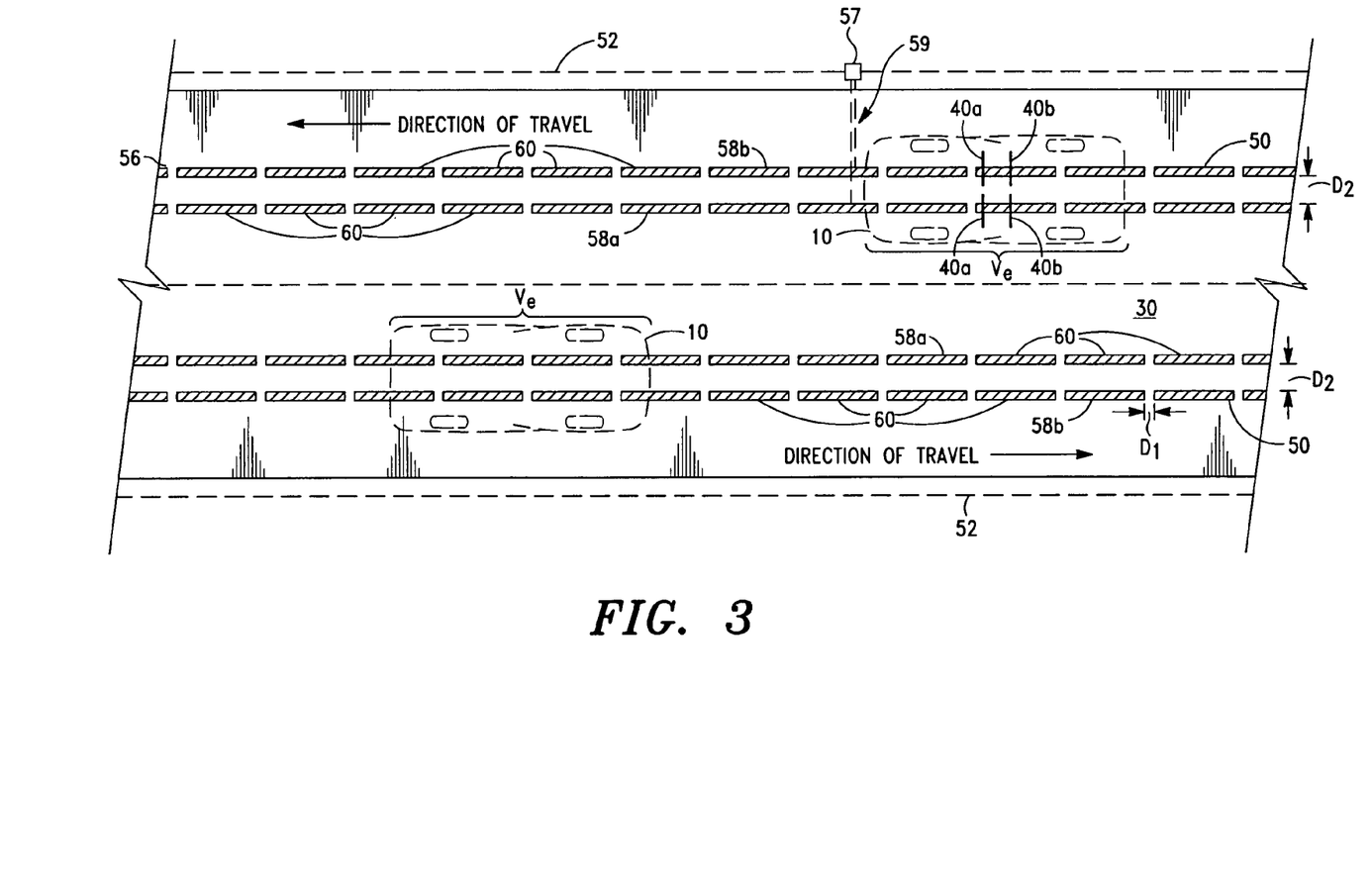
FIG. 3 is a top plan view of powered roadways of the invention with vehicles traversing thereon, in accordance with one embodiment of the invention.

As illustrated in FIG. 3, the e-vehicle engagement system 56 further includes at least one, more preferably, a plurality of power junction boxes 57 that house control system 54 equipment and that are operatively connected to the surface mounted conductors 58a, 58b via underground power/control cables 59.

Figure 5A:
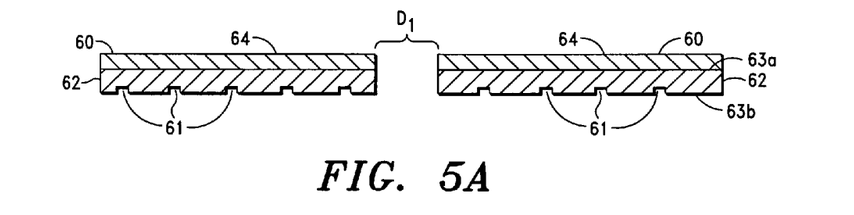
FIGS. 5A and 5B are side sectional plan views of powered roadway segments, in accordance with the invention.
Figure 5B:
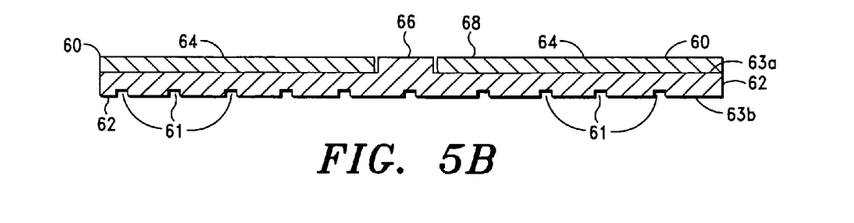
Figure 6A:
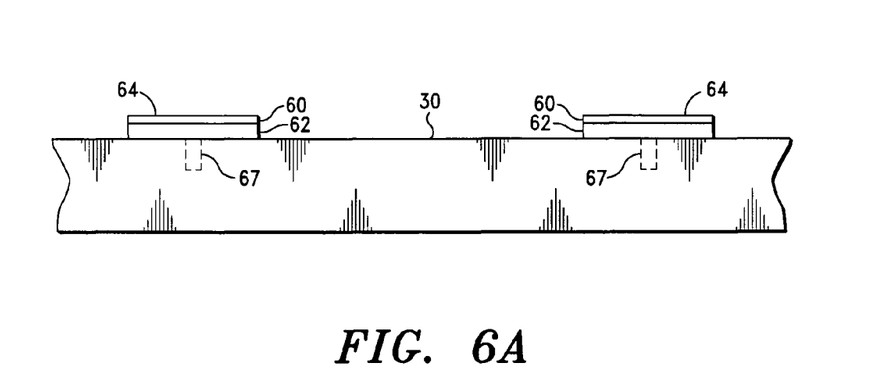
FIG. 6A is a rear plan view of a roadway with powered roadway segments mounted thereon, in accordance with one embodiment of the invention.

Referring now to FIGS. 5A, 5B and 6A, in a preferred embodiment, each segment 60 includes an insulation layer 62 and a conducting layer 64, which, as illustrated in FIG. 5A, is attached to the top surface 63a of the insulating layer 62.

In some embodiments of the invention, the insulation 62 and conducting 64 layers are preferably non-continuous when mounted on a roadway surface 30, such as shown in FIGS. 3 and 5A. In some embodiments, the insulation 62 and conducting 64 layers have a plurality of spaced regions $D_1$ (see FIG. 5A).

Referring now to FIG. 5B, in some embodiments, the insulating layer 62 has a raised region 66 that is designed and adapted fill the spaced regions $D_1$ of the conducting layers 64 to provide (i) an insulated gap and (ii) a substantially continuous and smooth contact surface 68.

In some embodiments, the insulation layer 62 further includes a plurality of substantially spaced water drainage grooves or slots 61 disposed on the bottom surface 63b thereof. In some embodiments, the grooves 61 comprise approximately 0.5×0.5 in. square slots.

According to the invention, the insulating layer 62 can comprise various conventional materials, including, without limitation, Micarta™, polyvinylchloride (PVC), polyethylene, Teflon™, silicon, and natural and synthetic rubber. In a preferred embodiment, each insulating layer 62 is constructed of Micarta™.

The conducting layer 64 can similarly comprise various conventional conductive materials, including, without limitation, galvanized iron, copper, brass, and copperweld. In a preferred embodiment, each conducting layer 64 is constructed of galvanized iron.

According to the invention, various thicknesses of the insulating 62 and conducting 64 layers can be employed. In some embodiments, the thickness of the insulating layers 62 is preferably in the range of approximately 1.50-3.0 in.

In a preferred embodiment of the invention, the thickness of the conducting layers 64 is sufficient to carry the amps and volts required by the largest electric vehicle that is envisioned to traverse the powered roadway 50. In some embodiments of the invention, the thickness of the conducting layers 64 is preferably in the range of approximately 0.375-0.500 in.

According to the invention, each segment 60 is also only energized when the energy harvesting system 20 is turned on and the vehicle 10, and, hence, system 20 is in contact with the segment 60. This safety feature eliminates the possibility of foot traffic contacting an energized segment while traversing across the roadway.

As stated above, the length of each segment 60 is also such that each segment 60 is de-energized before any part of a segment 60 is exposed outside of an electric vehicle envelope (denoted "$V_e$" in FIG. 3) while the vehicle 10 is moving thereon. As a result, pedestrians will not be exposed to an energized portion of the powered roadway system 50 at the same time a vehicle is engaged therewith.

In some embodiments, the length of each segment 60 is determined as follows: the in-line distance between the front and back tires of an envisioned electric vehicle plus 1 ft, minus the spaced distance (or insulated gap), $D_1$, between each segment 60, divided by two.

By way of example, for a vehicle having a tire spacing of approximately 12.0 ft and a spaced distance of approximately 6.0 in, the length of each segment 60 is preferably approximately 6.25 ft.

As will readily be appreciated by one having ordinary skill in the art, the noted segment length(s) is such that a total of four parallel segments 60 will be under the electric vehicle envelope, $V_e$, without any energized segments 60 being outside the vehicle envelope.

Referring now to FIG. 5A, the spaced distance (or gap) between each segment 60, i.e. $D_1$, is determined (or defined) as a function of the utility power source 52 voltage and electric vehicle energy harvesting system 20 design.

By way of example, for a roadway system 51 having a voltage in the range of 540-660 volts alternating current (v ac), the spaced distance, $D_1$, between each segment 60 is preferably in the range of 5.75-6.25 in. More preferably $D_1$ is approximately 6.0 in.

According to the invention, the transverse (and, preferably, insulated) spacing between each segment 60 (denoted "$D_2$" in FIG. 3) is determined (or defined) as a function of the utility power source 52 voltage and parameters, and electric vehicle energy harvesting system 20 design (discussed in detail below).

By way of example, for a roadway system 51 having a voltage in the range of 540-660 v ac, the transverse spacing, i.e. $D_2$, between each segment 60 is preferably in the range of 1.75-2.25 ft. More preferably, $D_2$ is approximately 2.0 ft.

According to the invention, each segment 60 can be engaged to or mounted on a roadway surface 30 by various conventional means. Referring to FIG. 6A, in some embodiments of the invention, each segment 60 is surface mounted on the roadway surface 30 by spaced stainless steel anchors 67.

Figure 6B:
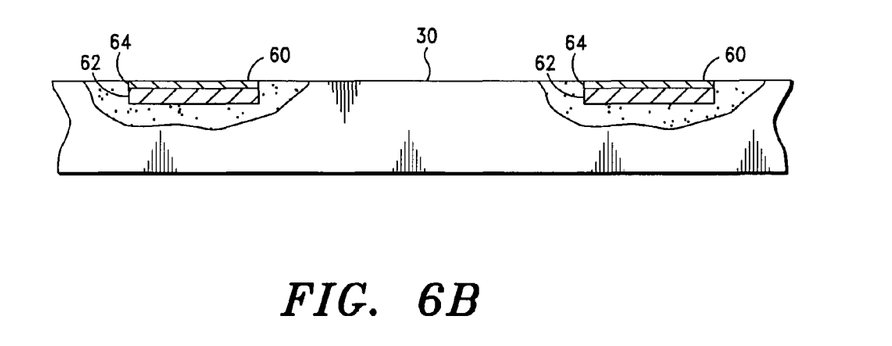
FIG. 6B is a rear plan view of a roadway with powered roadway segments embedded therein, in accordance with one embodiment of the invention.

In some embodiments; particularly, embodiments for new roadway construction, the segments 60 can also be embedded in the roadway by conventional means, such as shown in FIG. 6B. In the noted embodiments, conventional drainage means can also be employed.

Figure 7A:
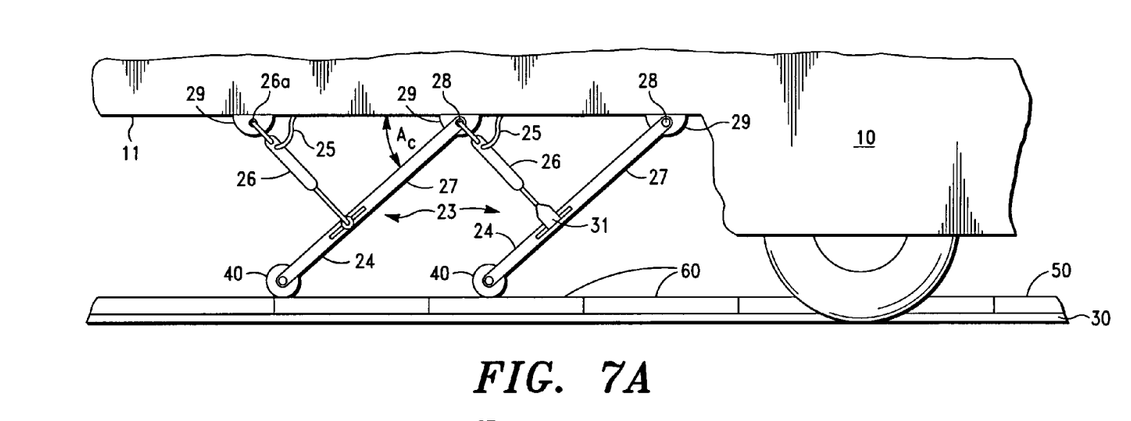
FIG. 7A is a side plan view of an electric vehicle with a rolling contact assembly mounted thereon, in accordance with one embodiment of the invention.

Referring now to FIG. 7A, in some embodiments of the invention, the electric vehicle energy harvesting system 20 includes at least two transversely oriented releasably secured rolling contacts 24 that are controlled by the electric vehicle processor 22.

In accordance with one embodiment of the invention, the electric vehicle 10 is powered when a rolling contact 24 is released and in contact with a roadway segment 60 and alternating voltage of approximately 600 v (@ 60 Hz) is transferred thereto. Preferably, control power for the electric vehicle 10 and, hence, rolling contacts 24 is provided by the electric vehicle's e-energy means 16, e.g., a 12 or 24 v direct current (v dc) battery.

In a preferred embodiment, when a vehicle operator releases (or lowers) the rolling contacts 24 by closing the control power switch 100a (which energizes a pneumatic solenoid 114 shown in the FIG. 8, i.e. the vehicle power and control schematic diagram), the rolling contacts 24 contact the roadway segments 60, which turns the electric vehicle power control system 14 on and the rolling contacts 24 disposed under the electric vehicle 10 energize.

As discussed in detail below, the rolling contacts 24 are initially energized with direct current (dc) control power to switch the power contactors 102, 103, and 202, shown in FIG. 8, and thereafter with alternating current (ac) traction power.

Figure 8:
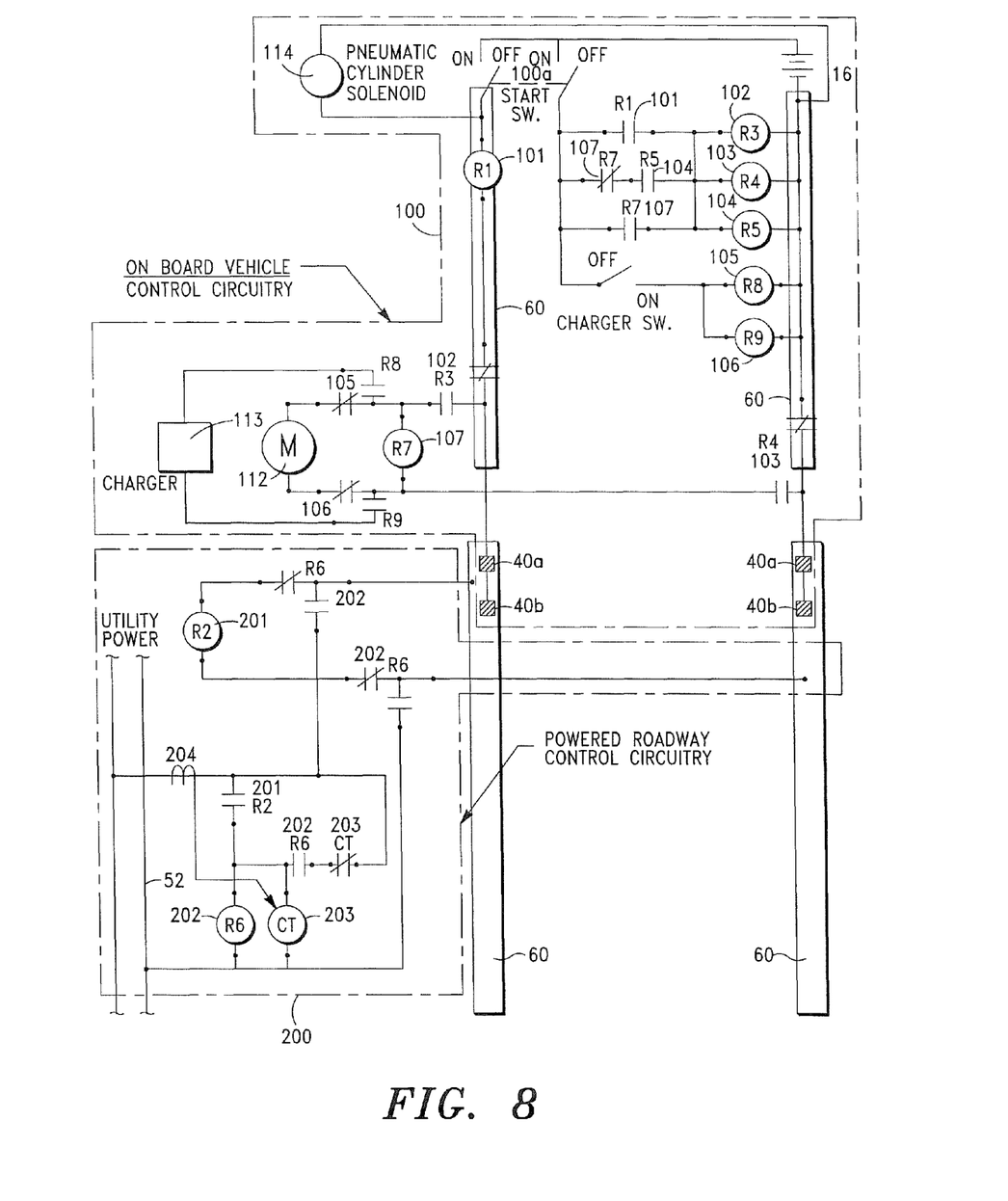
FIG. 8 is a schematic illustration of one embodiment of electric vehicle and powered roadway control circuits, in accordance with one embodiment of the invention.

As shown in FIG. 8 and discussed in detail below, in some embodiments, the control circuitry comprises of two 6 v dc relays: one located on the electric vehicle 10 and the other located off the powered roadway 50; both of which connecting in series in an open loop circuit that closes when the electric vehicle rolling contacts 24 are lowered and make contact with the roadway segments 60.

Referring back to FIG. 7A, the rolling contacts 24 are primary components of the vehicle energy harvesting system 20 and are preferably disposed in a quasi horizontal position underneath the body of the electric vehicle 10 when the vehicle 10 is powered by its own e-energy means 16.

To connect the electric vehicle 10 to the powered roadway system 50, rolling contacts 24 are released and lowered automatically to a contact position with the powered roadway segments 60. In some embodiments of the invention, the rolling contacts 24 are released and lowered by single acting pneumatic actuators 26. Preferably, the actuators 26 are positioned and adapted to maintain contact of the rolling contacts 24 to the powered roadway system 50.

In a preferred embodiment, the contact angle of the rolling contacts 24 (denoted "$A_c$" in FIG. 7A) is in the range of approximately 42°-47° with respect to the roadway surface 30. In the noted angular orientation, the physical impact to the rolling contacts 24 and energy harvesting system 20 due to contact deformities, unleveled surfaces, accumulation of foreign matter, etc., when the electric vehicle 10 traverses the roadway is lessened.

Figure 4:
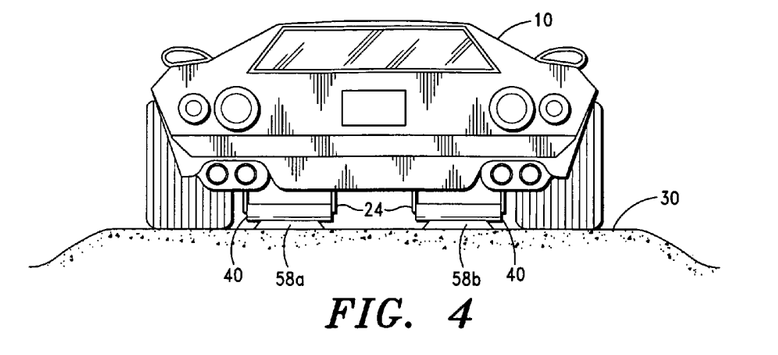
FIG. 4 is a rear plan view of an electric vehicle of the invention traversing a powered roadway, in accordance with one embodiment of the invention.

Referring back to FIG. 7A, the energy harvesting system 20 includes a contact assembly (denoted generally "23") that includes at least one set of the aforementioned rolling contacts 24. As illustrated in FIGS. 4 and 7A, in some embodiments of the invention, the contact assembly 23 includes four rolling contacts 24 to connect power of the energized roadway segments 60 to the contact assembly 23 and, hence, vehicle 10.

Figures 7B, 7C:
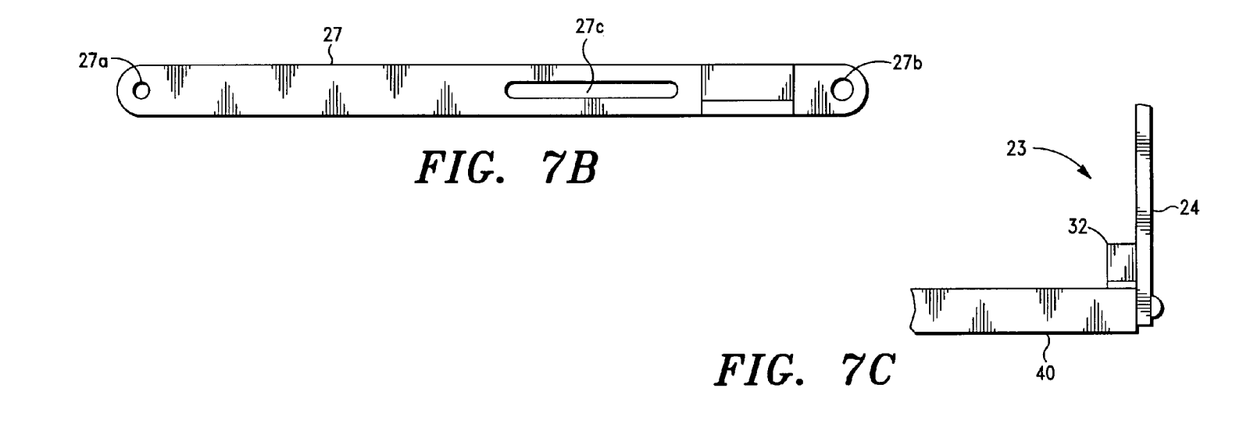
FIG. 7B is a side plan view of a rolling contact lever, in accordance with one embodiment of the invention.
FIG. 7C is a partial rear plan view of a rolling contact assembly, in accordance with one embodiment of the invention.

Referring now to FIG. 7B, in some embodiments of the invention, each rolling contact 24 preferably includes a contact roller 40. As illustrated in FIG. 7B, each contact roller 40 is rotatably engaged to an end of each support lever 27 (shown in FIG. 7C and discussed below).

According to the invention, the rollers 40 can comprise various diameters. In some embodiments of the invention, the rollers have an outer diameter in the range of approximately 2.5-5.0 in, more preferable, in the range of approximately 3.5-4.5 in, and an approximately 1.0 in. internal diameter. The rollers 40 are also preferably adapted to receive internal bearings therein.

According to the invention, the rollers 40 can comprise various conductive materials, including, without limitation, galvanized iron, copper, brass, and copperweld, and design shapes to facilitate the transfer of power from the roadway segments 60 to the electric vehicle 10. In a preferred embodiment, each roller is constructed of galvanized iron. Support levers 27 are constructed of insulating materials similar to the materials used in insulating layer 62 reinforced for the intended duty.

In a preferred embodiment of the invention, the pneumatic actuators 26 comprise single acting cylinders with a spring return and pivot mount 26a. According to the invention, the pneumatic actuators 26 are powered via compressed air (which is provided via an on-board compressor (not shown) and line 25) to lower the rolling contacts 24 to a position where they contact the powered roadway segments 60.

When the vehicle control switch 100a is closed, a pneumatic cylinder solenoid 114 (see FIG. 8) is energized and the compressed air port of each pneumatic actuator 26 opens and extends the rolling contacts 24. When the solenoid 114 is de-energized, the compressed air port opens and an internal spring retracts the rolling contacts 24 to their original position.

As indicated, in some embodiments of the invention, each rolling contact 24 of the vehicle contact assembly 23 includes a support lever 27 (see FIGS. 7A and 7B). As illustrated in FIG. 7A, the vehicle contact assembly 23 also includes a plurality of assembly supports 29 that are operatively engaged to the vehicle chassis 11 and adapted to pivotally receive one end of the support levers 27.

As illustrated in FIG. 7B, each support lever 27 preferably includes a positioning slot 27c and lumens 27a, 27b disposed on the ends of the lever 27, which, when the levers 27 are operatively positioned in the supports 29, are adapted to pivotally receive connecting bolts 28.

According to the invention, the length of each support lever 27 is determined as a function of the ride height of the electric vehicle 10. In some embodiments of the invention, the length of each support lever 27 is, however, preferably in the range of 1.5-2.5 ft, more preferably approximately 2 ft.

In some embodiments of the invention, the width of each roller contact 40 is, however, preferably in the range of 1.5-2.5 ft, more preferably approximately 2 ft. The roller contact 40 width will allow a vehicle operator the flexibility to steer the vehicle 10 one (1) ft to the right and one (1) ft to the left from a driveway center position while maintaining contact with the roadway segments 60.

Referring back to FIG. 7A, in a preferred embodiment of the invention, the rolling contacts 24 include a pivoting fork 31, which is adapted to facilitate engagement of each pneumatic cylinder 26 to a respective lever slot 27c with a fork bolt (not shown), whereby the rolling contacts 24 can be positioned to a maximum height and a minimum low position. The purpose of limiting the low position of the rolling contacts 24 is to prevent the rolling contacts 24 from hitting the road and sustaining damage when the vehicle 10 moves in areas where there are no powered segments 60.

Referring now to FIG. 7C, in a preferred embodiment, the contact assembly 23 further includes carbon brush assemblies 32. Preferably, each carbon brush assembly 32 is connected to a number 2 AWG, 600 v, insulated copper conductor that conducts utility power to the vehicle 10.

It is to be understood that the afore described rolling contact assembly 23 is only one means of engagement by and between the vehicle energy harvesting system 20 and the powered roadway system 50. Indeed, various alternative means can be employed to automatically lower and raise the rolling contacts, such as various gear systems. The rolling contacts 24 can also comprise sliding contacts.

Referring now to FIG. 8, control system embodiments for the electric vehicle 10 and powered roadway 50 will now be described in detail. As illustrated in FIG. 8, the electric vehicle control system (or circuitry) 100 includes on/off switch 100a, charger 113 and the aforementioned pneumatic cylinder solenoid 114.

In a preferred embodiment of the invention, the system 100 operates as follows: when the double pole single throw switch 100a is switched on, pneumatic solenoid 114 is energized and the rolling contacts 24 are released and positioned, whereby rollers 40a, 40b (FIGS. 3 and 4) are in contact with the dual roadway segments 60. When the rolling contacts 24 make contact with the roadway segments 60, on-board relay 101 and off vehicle relay 201 connect in series and energize, reversing their off-the-shelf contact positions and energize relay coils 102, 103, 104, 202 and 203. The vehicle e-energy means 16, e.g., 12 V dc system, voltage is now isolated and the 120 V ac voltage from the roadway power source 52, e.g., utility power, energizes relays 202, 203 and 107. At this point, all relay contacts are preferably aligned with the roadway power source 52, i.e. utility power, and 120 V ac power starts flowing to the vehicle motor 112.

As the vehicle 10 moves forward, the forward rollers 40a of rolling contacts 24 reach the gap between segments 60 without causing any utility power discontinuity as the rear rollers 40b of rolling contacts 24 are still in contact with a segment 60 and, hence connected to utility power and the forward and the backward rolling contacts 24, having the same phase or polarity, are interconnected.

After leaving a gap ($D_1$) between segments 60, the forward contacts 24 contact a new segment 60 and the rearward rolling contact 24 disengages from the rearward segment 60, which de-energizes as a result of loss of current flow. In a preferred embodiment, the loss of current flow is detected by a current transformer 204 and relay 203 and opening up the sealed-in circuit, which reverts the powered roadway control circuitry 200 to the original status.

Upon rolling contacts 40b disengaging from the rearward segment 60, the power from the power source 52, e.g., 120 v ac utility power, is disconnected and relay 107 is de-energized, opening closed contact 107 that de-energizes relay coils 102, 103 and 104 and reverts the vehicle circuitry 100, i.e. 12 v dc circuit, to the original condition.

The cycle repeats again when relays 101 and 201 are re-energized. This cycling operation is repeated infinitely until the vehicle 10 leaves the powered roadway.

When the vehicle rollers 40a, 40b and, hence, rolling contacts 24 disengage from the roadway segments 60, the vehicle control circuit 100 opens, which resets the circuit 100 for another energization cycle. Turning off control switch 100a results in the retraction of the rolling contacts 24 to their original position. In some embodiments of the invention, relays 102, 103, 105, 106, and 202 are contactor coils, motor 112 is 575 v ac controlled by a variable frequency drive and utility power is 600 v ac.

Figure 9:
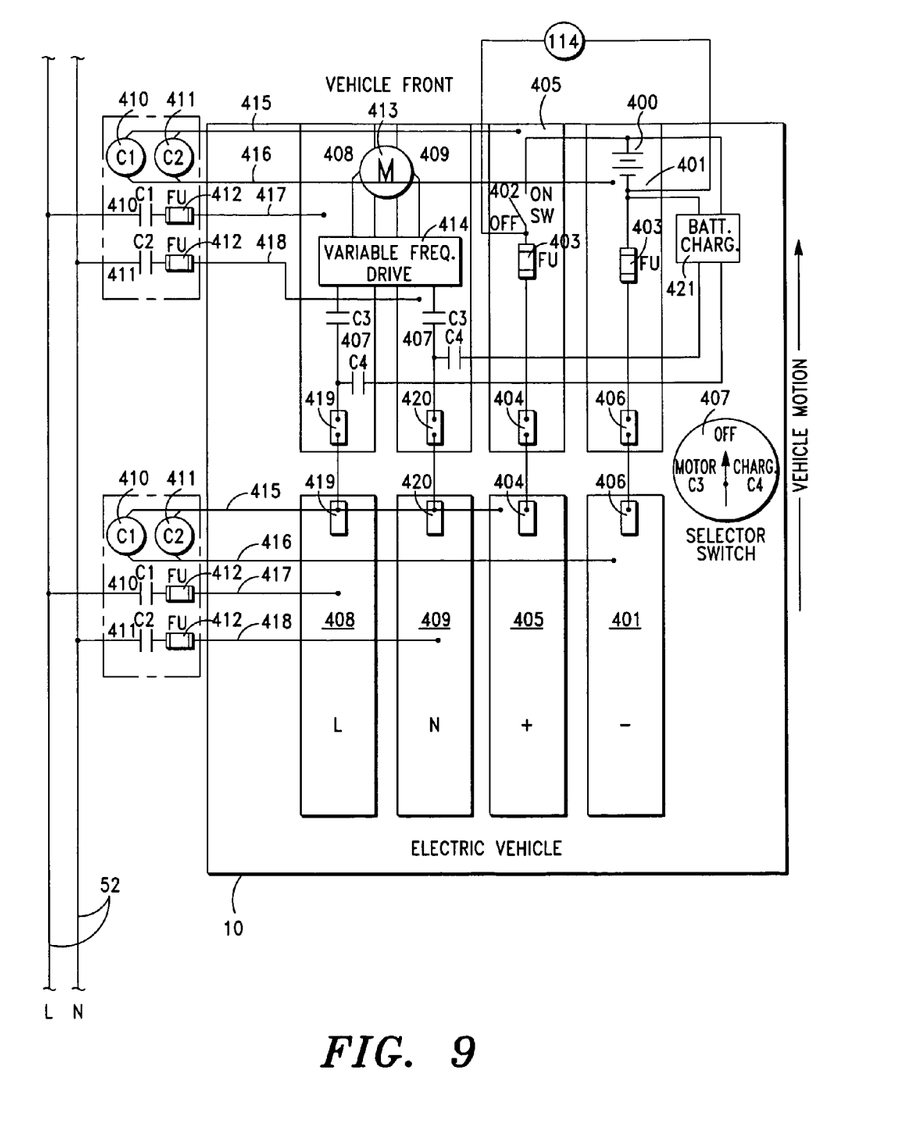
FIG. 9 is a schematic illustration of another embodiment of electric vehicle and powered roadway control circuits, in accordance with one embodiment of the invention.

Referring now to FIG. 9, operation of a four parallel segment system, i.e. segments 401, 405, 408 and 409, will be described in detail. Upon closing single pole single throw switch 402, pneumatic solenoid 114 is energized and the rolling contacts 24 are released and positioned, whereby rollers 404, 406, 419 and 420 are in contact with segments 401, 405, 408 and 409 respectively. Positive voltage from the vehicle e-energy means 16, i.e. 12 v dc battery 400, is thereby applied to roadway segments 405 and negative voltage to segments 401 through rolling contacts 404 and 406, respectively.

In a preferred embodiment of the invention, roadway segments 401 are connected with insulated #12 AWG copper wires 416 to the negative side of off-road relays 410 and 411 and roadway segments 405 are connected with #12 AWG copper wires 415 to the positive side of off-road relays 410 and 411.

In some embodiments, relays 410 and 411 comprise standard automobile relays with one C-type contact. The relays 410, 411 are preferably connected in parallel for the purpose of obtaining two separate contacts that actuate simultaneously. According to the invention, application of 12 v dc voltage to relays 410 and 411 cause their contacts to reverse their normally open status to normally close status, connecting the roadway power source 52, e.g., 120 v ac utility power, to the on-board motor through the rolling contacts 404, 406, 419 and 420.

In some embodiments of the invention, a variable frequency drive 414 is employed for the purpose of speed control.

As illustrated in FIG. 9, a three position selector switch 407 is provided for selection or connection of motor 413 and battery charger 421; the third position being an off position.

According to the invention, when the vehicle 10 is off the powered roadway and parked in a garage or driveway equipped with power segments 60, the selector is turned to the "battery charge" position to maintain the battery charged.

During vehicle motion, the system operates as follows: with selector switch 402 closed, relays 410 and 411 close their normally open contacts, connecting the roadway power source 52, e.g., 120 v ac utility power, to motor 413. As the vehicle continues moving forward, rolling contacts, 404, 406, 419 and 420 maintain continued connectivity between the on-board and the on-road power and control circuitry.

In a preferred embodiment of the invention, the powered roadway segments 401, 405, 408, 409 are energized only when physically located under the vehicle 10 and, most importantly, within the electric vehicle envelope $V_e$. Once a segment is about to exit the vehicle envelope, the rolling contacts 404 and 406 disengage from segments 401 and 405 and relays 410 and 411 de-energize, opening their contacts and disconnecting the utility power.

Figure 10:
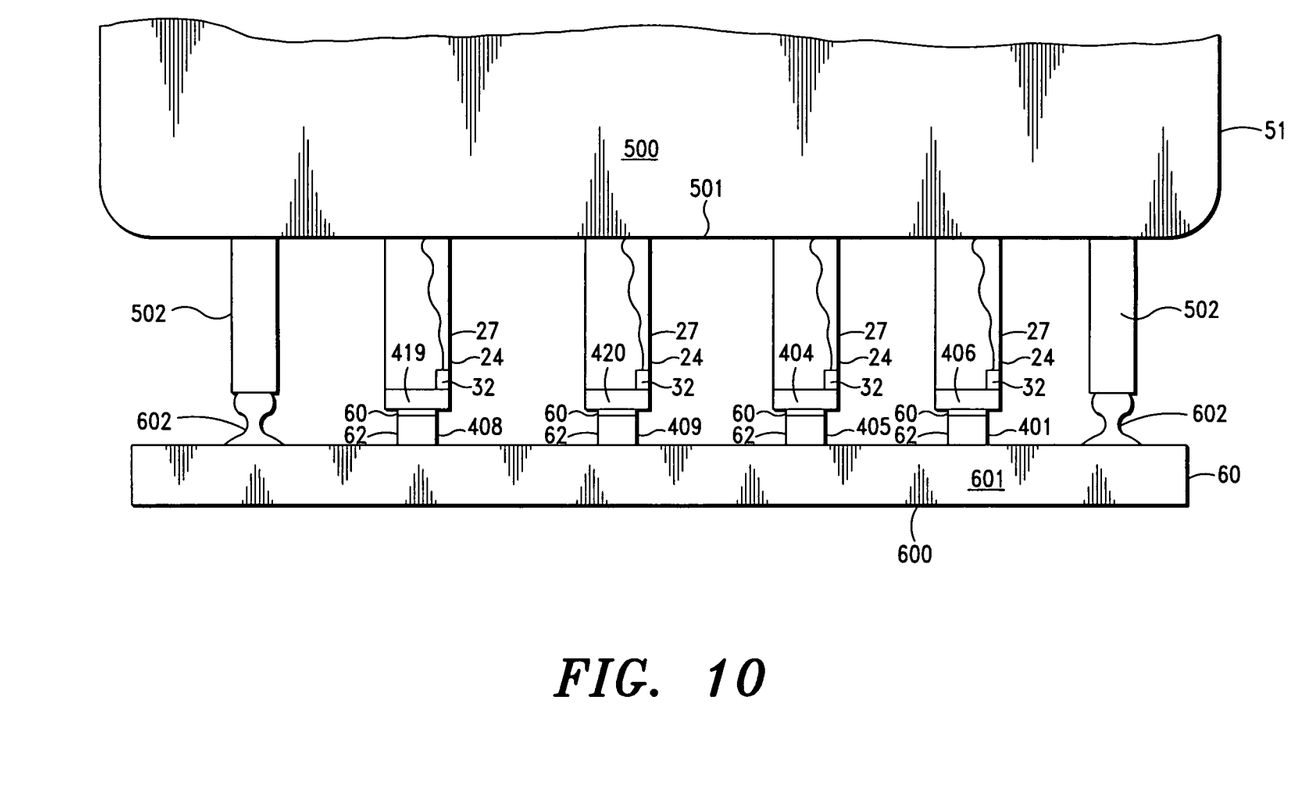
FIG. 10 is a partial rear plan view of one embodiment of an electric railway car and associated railway system, incorporating e-vehicle and roadway power systems of the invention.

According to the invention, the an e-vehicle and roadway power systems 11, 50 that are illustrated in FIGS. 2, 6A, 6B, 7A, 7B, 7C and 9 can also be employed with and/or incorporated into standard railway (or railroad) vehicles and associated track systems. Referring now to FIG. 10, there is shown one embodiment of a railway car 500 and associated track system 600.

As illustrated in FIG. 10, the track system 600 includes a pair of rails 602, which are connected to a plurality of ties 601. In one embodiment of the invention, the track system 600 further includes a roadway power system 50 of the invention, having the vehicle engagement system 56 and associated roadway segments 401, 405, 408 and 409, control system 54 and power source 52, discussed above.

The railway car 500 includes standard wheels 502 that are adapted roll on rails 602 and an e-vehicle power system 11 of the invention. According to the invention, the e-vehicle power system 11 includes the power control system 14, electrical energy means 16, independent power source 18, energy harvesting system 20, and processor 22, discussed above.

As also illustrated in FIG. 10, the energy harvesting system similarly includes a plurality of rolling contacts 24 disposed at the ends of rotatable support levers 27. According to the invention, the support levers 27 are similarly releasably engaged to the bottom of the railway car body 501.

As will readily be appreciated by one having ordinary skill in the art, the heart of the present invention lies in the unique synergistic relationship by and between the electric vehicle energy harvesting system and the powered roadway system, whereby when an electric vehicle passes over the roadway segments and the rolling contacts are operatively connected thereto, the segments are automatically energized by the system control logic, and as the vehicle continues traversing forward, the control relays automatically de-energize the segments that are about to be exposed outside of the vehicle envelope when the rolling contacts reach the gap between the powered segments. The gap(s) between the segments thus control the energizing and de-energizing of the segments.

As will also be readily appreciated by one having ordinary skill in the art, the powered roadway system (or segments thereof) need not be installed the entire length of a roadway. Designated segments of a roadway, e.g., a few miles, can be provided with the roadway system or segments thereof to charge electric vehicle batteries.

According to the invention, the powered roadway system or segments thereof can be incorporated into driveways or garages to charge electric vehicle batteries.

As will readily be appreciated by one having ordinary skill in the art, the present invention provides numerous advantages compared to prior art methods and systems for powering and charging electric vehicles. Among the advantages are the following:

The provision of an improved roadway power system for an electric vehicle having segmented, parallel electrically-conducting surfaces that are energized only upon engagement with an electric vehicle operating on the roadway and demanding power The provision of a roadway power system is safe for foot traffic that may come in contact with the powered roadway.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. An electrical vehicle transportation system, comprising:

an electrical vehicle and a powered roadway system, said electrical vehicle having a power source and a vehicle master control system, said master control system including switching means having electrical power on and off positions, said master control system further including vehicle circuitry having at least a first relay, said electrical vehicle further having at least a first front wheel and at least a first longitudinally spaced rear wheel, said first front and first rear wheels being configured to traverse over a roadway surface, said powered roadway system including an electrical vehicle engagement system, a roadway control system, roadway control circuitry having at least a first relay, and roadway electrical energy source, said electrical vehicle engagement system being in communication with said roadway electrical energy source and including at least two pair first and second pairs of elongated longitudinally and laterally spaced parallel electrically conductive roadway segments, each of said first and second roadway segments having a segment length ($S_1$), said first and second roadway segments being arranged on said roadway surface, said first and second roadway segments including electrically conductive layers having top and bottom surfaces and insulating layers disposed on said conductive layer bottom surfaces, a longitudinal spacing ($D_1$) between said first and second roadway segments being a function of first roadway electrical energy source voltage, which is approximately 0.01 inch per volt of the roadway energy source voltage, said roadway segment length ($S_L$) being a function of said first front wheel and first rear wheel longitudinal spacing and said roadway segment longitudinal spacing ($D_1$), which is an in-line distance between the front and rear wheels of the vehicle plus 1 ft, minus the roadway segment longitudinal spacing ($D_1$), then divide by two, said electrical vehicle including a vehicle power control system, said power source, an independent electrical energy source and an energy harvesting system, said vehicle power control system including a hard-wired relay control sub-system, wherein said vehicle control circuitry first relay and said roadway control circuitry first relay are connected in series, said vehicle electrical energy source having sufficient electrical energy to power said vehicle power source upon command of said vehicle power control system, said electrical energy harvesting system including at least one pair of roadway contacts having first and second ends, said first end of said roadway contacts including an electrically conductive region, said second end of said roadway contacts being releasably and rotatably engaged on each side of said vehicle and spaced apart a distance substantially equal to a lateral spacing of said first and second conductive roadway segments, whereby said vehicle can be positioned on said roadway with said roadway contacts in contact with said electrically conductive layers of at least one pair of said first and second roadway segments and, hence, whereby said vehicle energy harvesting system is coupled to said roadway electrical vehicle engagement system, said vehicle energy harvesting system, when coupled to said roadway electrical vehicle engagement system, defining a first vehicle envelope characterized by substantially all electrical energy associated with said coupled vehicle energy harvesting system and roadway electrical vehicle engagement system being substantially contained within an area defined by outer dimensions of said vehicle, said vehicle control system being operatively connected to said vehicle electrical energy source and said vehicle energy harvesting system, and in communication with said roadway control system when said vehicle energy harvesting system and roadway electrical vehicle engagement system are coupled, said vehicle control system being programmed to release said roadway contacts upon positioning said master control system switching means to said power on position, whereby said vehicle circuitry and said hard-wired relay control sub-system are energized and said vehicle roadway contacts are in contact with at least said first parallel roadway segments, said vehicle control system being further programmed to control transfer of electrical energy from said roadway electrical energy source to said vehicle when said vehicle energy harvesting system and roadway electrical vehicle engagement system are coupled, and, in conjunction with said roadway control system and said vehicle hard-wired relay control sub-system, when said vehicle energy harvesting system and roadway electrical vehicle engagement system are coupled, the roadway segments that are disposed within said vehicle envelope are energized, said vehicle control system being further programmed to de-energize said first roadway segments in response to a first current flow signal generated by a current transformer and transmitted to said vehicle control system, said current flow signal being generated and transmitted when said roadway contacts are de-coupled from said first roadway segments, transition over said longitudinal spacing between said first and second roadway segments ($D_1$), and coupled to said second roadway segments, whereby said first roadway segments are de-energized prior to said first roadway segments transitioning outside said vehicle envelope when said vehicle is traversing said roadway surface.

2. The electrical vehicle transportation system of claim 1, wherein said longitudinal spacing between said first and second roadway segments ($D_1$) is in the range of approximately 5.75-6.25 in.

3. The electrical vehicle transportation system of claim 1, wherein said vehicle control system is programmed to energize said first roadway segments when said vehicle energy harvesting system and roadway electrical vehicle engagement system are coupled and said vehicle control system is energized by said vehicle master control system.

4. The electrical vehicle transportation system of claim 1, wherein said vehicle electrical energy harvesting system includes at least two pair of roadway contacts.

5. The electrical vehicle transportation system of claim 1, wherein said conductive region of said roadway contacts comprises a rolling conductive region.

* * * * *